United States Patent
Andes et al.

(10) Patent No.: US 6,280,520 B1
(45) Date of Patent: Aug. 28, 2001

(54) MULTILAYER PEARL LUSTER PIGMENT BASED ON AN OPAQUE SUBSTRATE

(75) Inventors: Stephanie Andes, Maintal; Dieter Brückner, Darmstadt; Gerald Fuchs-Pohl, Weiterstadt; Matthias Kuntz, Seeheim; Gerhard Pfaff, Münster; Reiner Vogt, Kranichstein, all of (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 09/294,054

(22) Filed: Apr. 19, 1999

(30) Foreign Application Priority Data

Apr. 18, 1998 (DE) .............................. 198 17 286

(51) Int. Cl.$^7$ ..................................... C04B 1/32
(52) U.S. Cl. ....................... 106/415; 106/417; 106/418
(58) Field of Search .................... 106/415, 417, 106/418

(56) References Cited

U.S. PATENT DOCUMENTS

| | | | | |
|---|---|---|---|---|
| 4,434,010 | | 2/1984 | Ash ........................................ | 106/415 |
| 5,350,448 | * | 9/1994 | Dietz et al. ........................... | 106/415 |
| 5,540,770 | * | 7/1996 | Schmid et al. ....................... | 106/415 |
| 5,573,584 | * | 11/1996 | Ostertag et al. ..................... | 106/417 |
| 5,624,486 | * | 4/1997 | Schmid et al. ....................... | 106/415 |
| 5,626,661 | * | 5/1997 | Schmid et al. ....................... | 106/415 |
| 5,827,361 | * | 10/1998 | Bernhardt et al. .................... | 106/415 |
| 5,855,660 | * | 1/1999 | Bujard et al. ........................ | 106/418 |
| 5,858,078 | * | 1/1999 | Andes et al. ......................... | 106/415 |
| 5,885,342 | * | 3/1999 | Gale et al. ........................... | 106/417 |
| 5,958,125 | * | 9/1999 | Schmid et al. ....................... | 106/417 |
| 5,972,098 | * | 10/1999 | Andes et al. ......................... | 106/415 |
| 5,985,020 | * | 11/1999 | Andes et al. ......................... | 106/415 |

FOREIGN PATENT DOCUMENTS 3-120351   5/1991 (JP).
7-246366   9/1995 (JP).

OTHER PUBLICATIONS

Dialog Web Abstract No. DE 19707805 A.

* cited by examiner

Primary Examiner—C. Melissa Koslow
Assistant Examiner—Veronica F. Faison
(74) Attorney, Agent, or Firm—Millen White Zelano & Branigan

(57) ABSTRACT

Multilayer pearl luster pigment based on an absorbing platelet-shaped substrate which is coated with alternating layers of a material of low refractive index and a material of high refractive index, or with a metal, the difference in the refractive indices being at least 0.1.

13 Claims, No Drawings

MULTILAYER PEARL LUSTER PIGMENT BASED ON AN OPAQUE SUBSTRATE

The invention relates to a multilayer interference pigment consisting of alternating layers of a material of low refractive index and a material of high refractive index or of a metal on an absorbing platelet-shaped substrate which is opaque or semi-opaque.

BACKGROUND OF THE INVENTION

Multilayer pigments with alternating layers of a material of high refractive index and a material of low refractive index are known. The majority of them comprise metal oxides. Alternatively, the material of high refractive index can be replaced by a semi-transparent metal layer. The metal oxide layers are prepared either by a wet technique, by precipitating the metal oxide hydrates from a metal salt solution onto a carrier material, or by vapor deposition or sputtering in a vacuum. For instance, U.S. Pat. No. 4,434,010 describes a multilayer interference pigment consisting of a central layer of a reflective material (aluminum) and alternating layers of two transparent, dielectric materials of high and low refractive index, for example titanium dioxide and silicon dioxide, on either side of the central aluminum layer. In a further embodiment of the pigment, the layers following the centralaluminum layer are formed by magnesium fluoride and chromium. This pigment is used to print securities.

JP H7-759 (A) describes a multilayer interference pigment having a metallic luster It consists of a substrate coated with alternating layers of titanium dioxide and silicon dioxide. The substrate is formed from flakes of aluminum gold or silver, or from flakes of mica and glass which are coated with metals.

All types of pigment having an opaque metal layer as the central layer have the disadvantage that all wavelengths are reflected at this reflection layer, with the effect that, although a high luster is obtained, the actual interference color is overridden at the same time.

EP 0 753 545 describes goniochromatic luster pigments based on titanium dioxide-coated mica pigments whose $TiO_2$ coating is partly reduced. Owing to the titanium suboxides, titanium oxynitrides and titanium nitrides formed during the reduction, the titanium dioxide layer has a blue to violet coloration.

All of the multilayer interference pigments referred to are based on a transparent substrate or on an opaque, reflective metal layer as the middle layer. All pigments with a multilayer structure on a transparent substrate, examples being mica, $SiO_2$ flakes and $TiO_2$ flakes, have the disadvantage that, in the case of coating materials, it is often necessary to add absorption pigments to these pigments in order to obtain an adequate hiding power. When absorption pigments are mixed in, however, the color flop of the interference pigment is greatly attenuated.

All pigments with a multilayer structure on a central metal layer have the disadvantage that all wavelengths are reflected at this reflection layer. In order to reduce this effect, these high-hiding pigments as well are admixed with absorption pigments, as the result of which there is likewise an attenuation of the color flop.

DE 197 07 805, unpublished at the priority date of the present invention, discloses multilayer interference pigments having an absorbing middle layer, which are prepared by vapor deposition or sputtering of the individual layers onto a continuous belt which is provided with a detachment layer. These pigments have the disadvantage that, during the detachment of the dried film from the belt, and because of the subsequent comminution, particles having open broken edges are produced. Since these broken edges form scattering centers for the incident light, the luster of the pigment is reduced, which may lead to a disappearance of the interference effect.

SUMMARY OF THE INVENTION

An object of the invention is to provide an interference pigment having strong interference colors, a high angular dependency of the interference colors, and a high hiding power.

Upon further study of the specification and appended claims, further objects and advantages of this invention will become apparent to those skilled in the art.

Objects are achieved in accordance with the invention by a pearl luster pigment based on multiply coated, platelet-shaped, non-metallic substrates which are opaque or semi-opaque and have at least a) one first layer comprising a metal oxide of high refractive index or a metal, b) one second layer comprising a metal oxide of low refractive index, c) one third layer comprising a metal oxide of high refractive index or a metal, and, if desired, d) one subsequent coat.

Further objects are achieved in accordance with the invention by a process for preparing the pigments of the invention by suspending the substrate in water and coating it alternately with a metal oxide hydrate of high refractive index and a metal oxide hydrate of low refractive index, by addition and hydrolysis of the corresponding, water-soluble metal compounds, the pH required for the precipitation of the respective metal oxide hydrate being established and kept constant by simultaneous addition of acid or base, and subsequently separating the coated carrier material from the aqueous suspension, drying it and, if desired, calcining it.

The invention additionally provides for the use of the pigments of the invention for pigmenting paints, printing inks, plastics, glazes for ceramics and glass, and cosmetics.

The invention additionally provides for the use of the pigments of the invention for pigmenting securities and document papers, and packaging, and for the laser marking of polymeric materials and papers.

For this purpose they can be employed as mixtures with customary commercial pigments, examples being organic and inorganic absorption pigments, metal-effect pigments, and LCP pigments.

The material of high refractive index used comprises metal oxides or mixtures of metal oxides with or without absorbing properties, and also metals.

Preference is given to $TiO_2$, $ZrO_2$, $Fe_2O_3$, $Fe_3O_4$, $Cr_2O_3$, $ZnO$ or $(SnSb)O_2$, or thin metal layers, for example of nickel or aluminum.

The material of low refractive index used comprises metal oxides, for example $Al_2O_3$ or $SiO_2$, or mixtures thereof.

The thickness of the layers of the materials of high and low refractive index affect the optical properties of the pigment. When a product having strong interference colors is preferred, the thickness of the layers with respect to one another must be established. If n is the refractive index of a layer and d is its thickness, the interference color of a thin layer is given by the product of n and d, i.e. the optical thickness. The colors of such a film which are produced in reflected light with perpendicular light incidence result from an intensification of the light of wavelength $$\lambda = \frac{4}{2N-1} \cdot nd$$

and by attenuation of light of wavelengths $$\lambda = \frac{2}{N} \cdot nd,$$

where N, the order of interference, is a positive integer. The variation in color which takes place as the film thickness increases is a consequence of the intensification or attenuation of certain light wavelengths through interference. For example, a 115 nm thick film of titanium dioxide with the refractive index 1.94 has an optical thickness of 115×1.94= 223 nm, and light of the wavelength 2×223 nm=446 nm (blue) is attenuated on reflection, so that the reflected light is yellow. In the case of multilayer pigments, the interference color is determined by the intensification of certain wavelengths, and if two or more layers in a multilayer pigment have the same optical thickness, the color of the reflected light becomes fuller and more intense as the number of layers increases. In addition to this, it is possible through an appropriate choice of layer thicknesses to achieve a particularly strong variation of the color as a function of the viewing angle. A pronounced color flop is developed, which may be desirable for the pigments according to the invention.

The thickness of the individual layers in the case of metal oxide materials of high refractive index is preferably from to 300 nm, more preferably from 20 to 200 nm. The thickness of the metal layers is preferably approximately from 5 to 35 nm. The materials of high refractive index preferably have a refractive index of from 1.8 to 2.9, for example.

In the case of materials of low refractive index, the layer thickness for pigments with intense interference colors is preferably from 2 to 300 nm, more preferably from 40 to 150 nm, and for pigments having a pronounced color flop is preferably from 2 to 800 nm, more preferably from 200 to 600 nm. The materials of low refractive index preferably have a refractive index of from 1.35 to 1.8.

The difference in refractive indices between a layer comprising a material of high refractive index and a layer comprising a material of low refractive index is at least 0.1.

Substrate materials used for the pigments of the invention are platelet-shaped materials which absorb some (i.e., semi-opaque) or all (i.e., opaque) of the incident light. Examples of fully absorbing substrates are graphite platelets and graphite-based pigments, as are described further in U.S. Pat. No. 5,228,911. The graphite platelets are heated at from 200 to 500° C. in an oxygen-containing atmosphere. As a result, carboxyl groups and phenolic hydroxyl groups are formed on the graphite surface which improve the adhesion of the metal oxide layer. Titanium dioxide is preferably used. The titanium dioxide is deposited by known techniques. The graphite platelets are freely available on the market.

Further suitable, fully absorbing substrates are ilmenite pigments and iron oxide pigments, as are described in U.S. Pat. No. 4,867,793. These are interference pigments which consist of mica and a layer of magnetite ($FeO \cdot Fe_2O_3$) or ilmenite ($FeTiO_3$). The magnetic layer is obtained by depositing the iron oxide from an iron (II) salt solution in the presence of an oxidizing agent or by exposing an $Fe_2O_3$ layer, deposited by known techniques, to a reductive atmosphere at elevated temperatures. If the $Fe_2O_3$ layer is deposited onto a titanium dioxide layer and the product is calcined in a reductive atmosphere at more than 800° C., a layer of iron titanate ($FeTiO_3$) is formed, which is known as ilmenite.

Furthermore, the substrate used can for the purposes of the invention also be pseudobrookite-coated mica, whose preparation is described further in U.S. Pat. No. 5,009,711.

Other suitable substrates are interference pigments according to U.S. Pat. No. 5,693,134, which consist of a platelet-shaped substrate, a first layer of titanium dioxide and a second, outer layer of a mixed oxide of copper and manganese of the general formula $Cu_xMn_{3-x}O_4$.

As a further opaque substrate it is also possible to use graphite-coated mica, or graphite-coated mica pigments. Their preparation is described in U.S. Pat. No. 5,271,771. Mica, or mica coated with metal oxides, is exposed to the flow of a readily volatile hydrocarbon gas at from 400 to 1000° C., or a liquid or solid carbon compound is applied to the starting material and the system is then pyrolysed, both variants being carried out in the absence of oxygen. In both cases the product comprises platelet-shaped particles covered by a thin graphite layer. Irrespective of the layer thickness, a product is obtained which absorbs completely and is therefore opaque, or which absorbs only partly and is therefore semi-transparent. This material is also suitable as a substrate for the pigments of the invention.

As partly absorbing substrates it is also possible to employ carbon inclusion pigments in accordance with DE 195 02 231. These multilayer pigments comprise carbon black in the outer titanium dioxide layer or in the underlying metal oxide layer. They are obtainable by calcining the coated platelet-shaped substrate at from 500 to 1000° C. under inert gas conditions.

It is also possible to use $SiO_2$ flakes with incorporated carbon black as partly absorbing substrates. According to the international application WO 93/08237, the $SiO_2$ flakes are prepared on a continuous belt by hydrolysis and solidification of a waterglass solution. In the course of this procedure, the carbon black is incorporated into the matrix which forms.

The metal oxide layers are preferably applied wet chemically, it being possible to use the wet chemical coating techniques developed for preparing pearl luster pigments; techniques of this kind are described, for example, in DE 14 67 468, DE 19 59 988, DE 20 09 566, DE 22 14 545, DE 22 15 191, DE 22 44 298, DE 23 13 331, DE 25 22 572, DE 31 37 808, DE 31 37 809, DE 31 51 343, DE 31 51 354, DE 31 51 355, DE 32 11 602, DE 32 35 017, or further patent documents and other publications.

For the coating operation, the substrate particles are suspended in water, and one or more hydrolyzable metal salts are added at a pH suitable for the hydrolysis, this pH being chosen such that the metal oxides or metal oxide hydrates are precipitated directly on the particles without any instances of secondary precipitation. The pH is usually held constant by simultaneous metered addition of an acid or base. Subsequently, the pigments are separated off, washed and dried and, if desired, are calcined, it being possible to optimize the calcination temperature with respect to the particular coating present. If desired, following the application of individual coatings, the pigments can be separated off, dried and, if desired, calcined before then being resuspended for the application of the further layers by precipitation.

In addition, coating can also be carried out by gas-phase coating in a fluidized-bed reactor, it being possible to apply accordingly, for example, the techniques proposed in EP 0 045 851 and EP 0 106 235 for preparing pearl luster pigments.

The metal oxide of high refractive index used is preferably titanium dioxide and the metal oxide of low refractive index used is preferably silicon dioxide.

For the application of the titanium dioxide layers, preference is given to the technique described in U.S. Pat. No. 3,553,001.

An aqueous titanium salt solution is added slowly to a suspension, heated to about 50–100° C., especially 70–80° C., of the material to be coated, and a substantially constant pH of about 0.5–5, in particular about 1.5–2.5, is maintained by simultaneous metered addition of a base, such as aqueous ammonia solution or aqueous alkali metal hydroxide solution, for example. As soon as the desired layer thickness of the $TiO_2$ precipitate on the substrate has been reached, the addition of both titanium salt solution and base is terminated.

This technique, which is also referred to as the titration technique, is notable for the fact that it avoids an excess of titanium salt. This is achieved by supplying per unit time only that quantity of titanium salt solution which is required for uniform coating with the hydrated $TiO_2$ and can be received per unit time by the available surface area of the substrate particles that are to be coated. Consequently, no hydrated titanium dioxide particles are produced that are not precipitated on the surface to be coated.

For the application of the silicon dioxide layers, the following technique can be employed: a sodium waterglass solution is metered into a suspension, heated to about 50–100° C., especially 70–80° C., of the material to be coated. The pH is held constant at from 4 to 10, preferably from 6.5 to 8.5, by simultaneous addition of 10% hydrochloric acid. Following the addition of the waterglass solution, the batch is subsequently stirred for a further 30 minutes.

It is additionally possible to alter the powder color of the pigment by applying further layers, such as colored metal oxides or Prussian Blue, compounds of the transition metals such as, for example, Fe, Cu, Ni, Co, Mn or Cr, or organic compounds such as dyes or lakes.

It is also possible to subject the finished pigment to an aftercoating or aftertreatment procedure, which enhances the light stability, weather stability and chemical stability, or which facilitates the handling of the pigment, especially its incorporation into different media. Suitable aftercoating or after-treatment techniques include those which are described, for example, in DE-C 22 15 191, DE-A 31 51 354, DE-A 32 35 017 or DE-A 33 34 598.

The substances applied additionally make up only from about 0.1 to 5% by weight, preferably from about 0.5 to 3% by weight, of the overall pigment.

The pigment of the invention can additionally be coated with firmly adhering organic or inorganic colorants of low solubility. Preference is given to the use of lakes, especially aluminum lakes. For this purpose, a layer of aluminum hydroxide is applied by precipitation, and in a second step it is laked with a lake pigment. The technique is described further in DE 24 29 762 and DE 29 28 287.

Preference is also given to additional coating with complex salt pigments, especially cyanoferrate complexes, such as, for example, Prussian Blue and Turnbull's Blue, as is described in EP 0 141 173 and DE 23 13 332.

The pigment of the invention can also be coated with organic dyes and, in particular, with phthalocyanine or metal phthalocyanine and/or indanthrene dyes in accordance with DE 40 09 567. For this purpose, a suspension of the pigment in a solution of the dye is prepared and this suspension is then brought together with a solvent in which the dye is soluble sparingly, if at all.

In addition, metal chalcogenides or metal chalcogenide hydrates and carbon black can also be employed for an additional coating.

The pigment can be used in a conventional manner for pigmenting paints, printing inks, plastics, cosmetics and glazes for ceramics and glass.

The pigments of the invention possess a high hiding power and exhibit a pronounced color flop. This means that the interference colors are highly dependent on the viewing angle. Because of these properties, absorption pigments need be added only in small amounts, if at all, when the pigments of the invention are used, for example, in car finishes. As a result, the color flop is retained in its entirety.

The entire disclosure of all applications, patents and publications, cited above and below, and of corresponding German Application No. 198 17 286.9, filed Apr. 18, 1998 is hereby incorporated by reference.

EXAMPLES

The examples which follow are intended to illustrate the invention in more detail without restricting it.

Example 1

100 g of graphite platelets are suspended in 2 l of deionized water and the suspension is heated to 75° C. with continual stirring.

The pH is adjusted to 2.2 with concentrated hydrochloric acid (37%). 550 ml of an aqueous $TiCl_4$ solution (400 g $TiCl_4$/l) are metered into this suspension over the course of 280 minutes. Throughout the addition, the pH is held constant at 2.2 with 32% NaOH solution.

After the end of the addition, precipitation is completed by stirring at 75° C. for a further 45 minutes. The pH of the suspension is raised to 7.5 with 32% NaOH solution, and 210 g of a sodium waterglass solution (13.5% by weight $SiO_2$) are metered in over the course of 40 minutes. During this addition, the pH is held constant at 7.5 with 10% hydrochloric acid. After the end of the addition, precipitation is completed by stirring at 75° C. for a further 45 minutes.

The pH of the suspension is lowered to 2.2 with 10% hydrochloric acid.

630 ml of an aqueous $TiCl_4$ solution (400 g $TiCl_4$/l) are metered in over the course of 320 minutes. Throughout the addition, the pH is held constant at 2.2 with 32% NaOH solution.

After the end of the addition, precipitation is completed by stirring at 75° C. for a further 45 minutes. Subsequently, the mixture is cooled to room temperature and the resulting pigment is filtered off, washed salt-free with deionized water and dried at 110° C. Thereafter, the pigment is calcined at 700° C. in an $N_2$ atmosphere for 30 minutes. The resultant pigment exhibits a dark green powder color with a deep green interference color.

Example 2

100 g of graphite platelets are suspended in 2 l of deionized water and the suspension is heated to 80° C. with continual stirring.

The pH is adjusted to 2.0 with concentrated hydrochloric acid (37%). 100 ml of a 3% $SnCl_4$ solution are metered into this suspension over the course of 25 minutes. During this time, the pH is held constant at 2.0 with 32% NaOH solution.

After a subsequent stirring period of 15 minutes, the pH is brought to 1.8 with 10% hydrochloric acid and 600 ml of an aqueous TiCl$_4$ solution (400 g TiCl$_4$/l) are metered into this suspension over the course of 300 minutes. Throughout the addition, the pH is held constant at 1.8 with 32% NaOH solution.

After the end of the addition, precipitation is completed by stirring at 80° C. for a further 15 minutes. The pH of the suspension is raised to 7.5 with 32% NaOH solution, and 430 g of a sodium waterglass solution (13.5% by weight SiO$_2$) are metered in over the course of 216 minutes. During this addition, the pH is held constant at 7.5 with 10% hydrochloric acid. After the end of the addition, precipitation is completed by stirring at 80° C. for a further 15 minutes.

The pH of the suspension is lowered to 2.0 with 10% hydrochloric acid.

100 ml of a 3% SnCl$_4$ solution are metered in over the course of 25 minutes. Throughout this time, the pH is held constant at 2.0 with 32% NaOH.

After a subsequent stirring period of 15 minutes, the pH is lowered to 1.8 with 10% hydrochloric acid and 590 ml of an aqueous TiCl$_4$ solution (400 g TiCl$_4$/l) are metered in over the course of 296 minutes. Throughout the addition, the pH is held constant at 1.8 with 32% NaOH solution.

After the end of the addition, precipitation is completed by stirring at 80° C. for a further 15 minutes. Subsequently, the mixture is cooled to room temperature and the resulting pigment is filtered off, washed salt-free with deionized water and dried at 110° C. Thereafter, the pigment is calcined at 700° C. in an N$_2$ atmosphere for 30 minutes.

This gives a pigment of dark green powder color with a pronounced color flop.

Example 3

100 g of Iriodin® 602, a mica pigment with a coating of TiO$_2$ and ilmenite, are suspended in 2 l of deionized water and the suspension is heated to 75° C. with continual stirring.

The pH is adjusted to 2.2 with concentrated hydrochloric acid (37%). 690 ml of an aqueous TiCl$_4$ solution (400 g TiCl$_4$/l) are metered into this suspension over the course of 350 minutes. Throughout the addition, the pH is held constant at 2.2 with 32% NaOH solution.

After the end of the addition, precipitation is completed by stirring at 75° C. for a further 45 minutes. The pH of the suspension is raised to 7.5 with 32% NaOH solution, and 260 g of a sodium waterglass solution (13.5% by weight SiO$_2$) are metered in over the course of 50 minutes. During this addition, the pH is held constant at 7.5 with 10% hydrochloric acid. After the end of the addition, precipitation is completed by stirring at 75° C. for a further 45 minutes.

The pH of the suspension is lowered to 2.2 with 10% hydrochloric acid.

790 ml of an aqueous TiCl$_4$ solution (400 g TiCl$_4$/l) are metered in over the course of 400 minutes. Throughout the addition, the pH is held constant at 2.2 with 32% NaOH solution.

After the end of the addition, precipitation is completed by stirring at 75° C. for a further 45 minutes. Subsequently, the mixture is cooled to room temperature and the resulting pigment is filtered off, washed salt-free with deionized water and dried at 110° C. Thereafter, the pigment is calcined at 850° C. in an N$_2$ atmosphere for 30 minutes. The resultant pigment exhibits a grey-green powder color with; a deep green interference color.

Example 4

100 g of Iriodin® 602, a mica pigment with a coating of TiO$_2$ and ilmenite, are suspended in 2 l of deionized water and the suspension is heated to 80° C. with continual stirring.

The pH is adjusted to 2.0 with concentrated hydrochloric acid (37%). 100 ml of a 3% SnCl$_4$ solution are metered into this suspension over the course of 25 minutes. During this time, the pH is held constant at 2.0 with 32% NaOH solution.

After a subsequent stirring period of 15 minutes, the pH is brought to 1.8 with 10% hydrochloric acid and 750 ml of an aqueous TiCl$_4$ solution (400 g TiCl$_4$/l) are metered into this suspension over the course of 375 minutes. Throughout the addition, the pH is held constant at 1.8 with 32% NaOH solution. After the end of the addition, precipitation is completed by stirring at 80° C. for a further 15 minutes.

The pH of the suspension is raised to 7.5 with 32% NaOH solution, and 533 g of a sodium waterglass solution (13.5% by weight SiO$_2$) are metered in over the course of 270 minutes. During this addition, the pH is held constant at 7.5 with 10% hydrochloric acid. After the end of the addition, precipitation is completed by stirring at 80° C. for a further 15 minutes.

The pH of the suspension is lowered to 2.0 with 10% hydrochloric acid.

100 ml of a 3% SnCl$_4$ solution are metered in over the course of 25 minutes. Throughout this time, the pH is held constant at 2.0 with 32% NaOH.

After a subsequent stirring period of 15 minutes, the pH is lowered to 1.8 with 10% hydrochloric acid and 740 ml of an aqueous TiCl$_4$ solution (400 g TiCl$_4$/l) are metered in over the course of 370 minutes. Throughout the addition, the pH is held constant at 1.8 with 32% NaOH solution.

After the end of the addition, precipitation is completed by stirring at 80° C. for a further 15 minutes. Subsequently, the mixture is cooled to room temperature and the resulting pigment is filtered off, washed salt-free with deionized water and dried at 110° C. Thereafter, the pigment is calcined at 850° C. in an N$_2$ atmosphere for 30 minutes.

This gives a pigment of grey-green powder color with a pronounced color flop.

Example 5

100 g of mica with a hiding coating of graphite and a particle size of 10–50 μm are suspended in 2 l of deionized water and the suspension is heated to 75° C. with continual stirring.

The pH is adjusted to 2.2 with concentrated hydrochloric acid (37%). 690 ml of an aqueous TiCl$_4$ solution (400 g TiCl$_4$/l) are metered into this suspension over the course of 350 minutes. Throughout the addition, the pH is held constant at 2.2 with 32% NaOH solution. After the end of the addition, precipitation is completed by stirring at 75° C. for a further 45 minutes.

The pH of the suspension is raised to 7.5 with 32% NaOH solution, and 260 g of a sodium waterglass solution (13.5% by weight SiO$_2$) are metered in over the course of 50 minutes. During this addition, the pH is held constant at 7.5 with 10% hydrochloric acid. After the end of the addition, precipitation is completed by stirring at 75° C. for a further 45 minutes.

The pH of the suspension is lowered to 2.2 with 10% hydrochloric acid.

790 ml of an aqueous TiCl$_4$ solution (400 g TiCl$_4$/l) are metered in over the course of 400 minutes. Throughout the addition, the pH is held constant at 2.2 with 32% NaOH solution.

After the end of the addition, precipitation is completed by stirring at 75° C. for a further 45 minutes. Subsequently, the mixture is cooled to room temperature and the resulting pigment is filtered off, washed salt-free with deionized water and dried at 110° C. Thereafter, the pigment is calcined at 700° C. in an $N_2$ atmosphere for 30 minutes. The resultant pigment exhibits a dark green powder color with a deep green interference color.

Example 6

100 g of mica with a hiding coating of graphite and a particle size of 10–50 μm are suspended in 2 l of deionized water and the suspension is heated to 80° C. with continual stirring.

The pH is adjusted to 2.0 with concentrated hydrochloric acid (37%). 100 ml of a 3% $SnCl_4$ solution are metered into this suspension over the course of 25 minutes. During this time, the pH is held constant at 2.0 with 32% NaOH solution.

After a subsequent stirring period of 15 minutes, the pH is brought to 1.8 with 10% hydrochloric acid and 750 ml of an aqueous $TiCl_4$ solution (400 g $TiCl_4$/l) are metered into this suspension over the course of 375 minutes. Throughout the addition, the pH is held constant at 1.8 with 32% NaOH solution.

After the end of the addition, precipitation is completed by stirring at 80° C. for a further 15 minutes. The pH of the suspension is raised to 7.5 with 32% NaOH solution, and 533 g of a sodium waterglass solution (13.5% by weight $SiO_2$) are metered in over the course of 270 minutes. During this addition, the pH is held constant at 7.5 with 10% hydrochloric acid. After the end of the addition, precipitation is completed by stirring at 80° C. for a further 15 minutes.

The pH of the suspension is lowered to 2.0 with 10% hydrochloric acid.

100 ml of a 3% $SnCl_4$ solution are metered in over the course of 25 minutes. Throughout this time, the pH is held constant at 2.0 with 32% NaOH.

After a subsequent stirring period of 15 minutes, the pH is lowered to 1.8 with 10% hydrochloric acid and 740 ml of an aqueous $TiCl_4$ solution (400 g $TiCl_4$/l) are metered in over the course of 370 minutes. Throughout the addition, the pH is held constant at 1.8 with 32% NaOH solution.

After the end of the addition, precipitation is completed by stirring at 80° C. for a further 15 minutes. Subsequently, the mixture is cooled to room temperature and the resulting pigment is filtered off, washed salt-free with deionized water and dried at 110° C. Thereafter, the pigment is calcined at 700° C. in a nitrogen atmosphere for 30 minutes.

This gives a pigment of dark green powder color with a pronounced color flop.

Example 7

105 g of a carbon inclusion pigment having a blue interference color and a particle size of 10–50 μm are suspended in 2 l of deionized water and the suspension is heated to 75° C. with continual stirring.

The pigment contains a $TiO_2$ layer into which carbon has been incorporated.

The pH of the suspension is raised to 7.5 with 32% NaOH solution, and 153 g of a sodium waterglass solution (13.5% by weight $SiO_2$) are metered in over the course of 75 minutes. During this addition, the pH is held constant at 7.5 with 10% hydrochloric acid. After the end of the addition, precipitation is completed by stirring at 75° C. for a further 45 minutes.

The pH of the suspension is lowered to 2.2 with 10% hydrochloric acid.

330 ml of an aqueous $TiCl_4$ solution (400 g $TiCl_4$/l) are metered in over the course of 165 minutes. Throughout the addition, the pH is held constant at 2.2 with 32% NaOH solution.

After the end of the addition, precipitation is completed by stirring at 75° C. for a further 45 minutes. subsequently, the mixture is cooled to room temperature and the resulting pigment is filtered off, washed salt-free with deionized water and dried at 110° C. Thereafter, the pigment is calcined at 850° C. in a nitrogen atmosphere for 30 minutes.

This gives a pigment of grey-blue mass tone with a deep blue interference color.

Example 8

126 g of a carbon inclusion pigment with a blue interference color and a particle size of 10–50 μm are suspended in 2 l of deionized water and the suspension is heated to 80° C. with continual stirring.

The pigment contains a $TiO_2$ layer into which carbon has been incorporated. The pH of the suspension is raised to 7.5 with 32% NaOH solution, and 533 g of a sodium waterglass solution (13.5% by weight $SiO_2$) are metered in over the course of 270 minutes. During this addition, the pH is held constant at 7.5 with 10% hydrochloric acid. After the end of the addition, precipitation is completed by stirring at 80° C. for a further 15 minutes.

The pH of the suspension is lowered to 2.0 with 10% hydrochloric acid.

100 ml of a 3% $SnCl_4$ solution are metered in over the course of 25 minutes. Throughout this time, the pH is held constant at 2.0 with 32% NaOH solution. After a subsequent stirring period of 15 minutes, the pH is lowered to 1.8 with 10% hydrochloric acid and 740 ml of an aqueous $TiCl_4$ solution (400 g $TiCl_4$/l) are metered in over the course of 370 minutes. Throughout the addition, the pH is held constant at 1.8 with 32% NaOH solution.

After the end of the addition, precipitation is completed by stirring at 80° C. for a further 15 minutes. Subsequently, the mixture is cooled to room temperature and the resulting pigment is filtered off, washed salt-free with deionized water and dried at 110° C. Thereafter, the pigment is calcined at 850° C. in a nitrogen atmosphere for 30 minutes.

The resultant pigment exhibits a grey-green mass tone with a pronounced color flop.

Example 9

100 g of mica with a semi-transparent coating of graphite and a particle size of 10–50 μm are suspended in 2 l of deionized water and the suspension is heated to 75° C. with continual stirring.

The pH is adjusted to 2.2 with concentrated hydrochloric acid (37%). 690 ml of an aqueous $TiCl_4$ solution (400 g $TiCl_4$/l) are metered into this suspension over the course of 350 minutes. Throughout the addition, the pH is held constant at 2.2 with 32% NaOH solution.

After the end of the addition, precipitation is completed by stirring at 75° C. for a further 45 minutes. The pH of the suspension is raised to 7.5 with 32% NaOH solution, and 260 g of a sodium waterglass solution (13.5% by weight $SiO_2$) are metered in over the course of 50 minutes. During this addition, the pH is held constant at 7.5 with 10% hydrochloric acid. After the end of the addition, precipitation is completed by stirring at 75° C. for a further 45 minutes.

The pH of the suspension is lowered to 2.2 with 10% hydrochloric acid.

790 ml of an aqueous $TiCl_4$ solution (400 g $TiCl_4$/l) are metered in over the course of 400 minutes. Throughout the addition, the pH is held constant at 2.2 with 32 NaOH solution.

After the end of the addition, precipitation is completed by stirring at 75° C. for a further 45 minutes. Subsequently, the mixture is cooled to room temperature and the resulting pigment is filtered off, washed salt-free with deionized water and dried at 110° C. Thereafter, the pigment is calcined at 700° C. in an $N_2$ atmosphere for 30 minutes. The resultant pigment exhibits a grey-green powder color with a deep green interference color.

Example 10

100 g of mica with a semi-transparent coating of graphite and a particle size of 10–50 μm are suspended in 2 l of deionized water and the suspension is heated to 80° C. with continual stirring.

The pH is adjusted to 2.0 with concentrated hydrochloric acid (37%). 100 ml of a 3% $SnCl_4$ solution are metered into this suspension over the course of 25 minutes. During this time, the pH is held constant at 2.0 with 32% NaOH solution.

After a subsequent stirring period of 15 minutes, the pH is brought to 1.8 with 10% hydrochloric acid and 750 ml of an aqueous $TiCl_4$ solution (400 g $TiCl_4$/l) are metered into this suspension over the course of 375 minutes. Throughout the addition, the pH is held constant at 1.8 with 32% NaOH solution.

After the end of the addition, precipitation is completed by stirring at 80° C. for a further 15 minutes. The pH of the suspension is raised to 7.5 with 32% NaOH solution, and 533 g of a sodium waterglass solution (13.5% by weight $SiO_2$) are metered in over the course of 270 minutes. During this addition, the pH is held constant at 7.5 with 10% hydrochloric acid. After the end of the addition, precipitation is completed by stirring at 80° C. for a further 15 minutes. The pH of the suspension is lowered to 2.0 with 10% hydrochloric acid.

100 ml of a 3% $SnCl_4$ solution are metered in over the course of 25 minutes. Throughout this time, the pH is held constant at 2.0 with 32% NaOH.

After a subsequent stirring period of 15 minutes, the pH is lowered to 1.8 with 10% hydrochloric acid and 740 ml of an aqueous $TiCl_4$ solution (400 g $TiCl_4$/l) are metered in over the course of 370 minutes. Throughout the addition, the pH is held constant at 1.8 with 32% NaOH solution.

After the end of the addition, precipitation is completed by stirring at 80° C. for a further 15 minutes. Subsequently, the mixture is cooled to room temperature and the resulting pigment is filtered off, washed salt-free with deionized water and dried at 110° C. Thereafter, the pigment is calcined at 700° C. in an $N_2$ atmosphere for 30 minutes.

This gives a pigment of grey-green powder color with a pronounced color flop.

Example 11

75 g of $SiO_2$ flakes colored by means of incorporated carbon black and with a particle size of 10–50 μm are suspended in 1.5 l of deionized water and the suspension is heated to 75° C. with continual stirring. The pH is adjusted to 2.2 with concentrated hydrochloric acid (37%). 690 ml of an aqueous $TiCl_4$ solution (400 g $TiCl_4$/l) are metered into this suspension over the course of 350 minutes. Throughout the addition, the pH is held constant at 2.2 with 32% NaOH solution.

After the end of the addition, precipitation is completed by stirring at 75° C. for a further 45 minutes. The pH of the suspension is raised to 7.5 with 32% NaOH solution, and 260 g of a sodium waterglass solution (13.5% by weight $SiO_2$) are metered in over the course of 50 minutes. During this addition, the pH is held constant at 7.5 with 10% hydrochloric acid. After the end of the addition, precipitation is completed by stirring at 75° C. for a further 45 minutes.

The pH of the suspension is lowered to 2.2 with 10% hydrochloric acid.

790 ml of an aqueous $TiCl_4$ solution (400 g $TiCl_4$/l) are metered in over the course of 400 minutes. Throughout the addition, the pH is held constant at 2.2 with 32% NaOH solution.

After the end of the addition, precipitation is completed by stirring at 75° C. for a further 45 minutes. Subsequently, the mixture is cooled to room temperature and the resulting pigment is filtered off, washed salt-free with deionized water and dried at 110° C. Thereafter, the pigment is calcined at 700° C. for 30 minutes. The resultant pigment exhibits a grey-green powder color with a deep green interference color.

Example 12

100 g of $SiO_2$ flakes colored by means of incorporated carbon black and with a particle size of 10–50 μm are suspended in 2 l of deionized water and the suspension is heated to 80° C. with continual stirring.

The pH is adjusted to 2.0 with concentrated hydrochloric acid (37%). 300 ml of a 3% $SnCl_4$ solution are metered into this suspension over the course of 100 minutes. During this time, the pH is held constant at 2.0 with 32% NaOH solution.

After a subsequent stirring period of 15 minutes, the pH is brought to 1.8 with 10% hydrochloric acid and 1020 ml of an aqueous $TiCl_4$ solution (400 g $TiCl_4$/l) are metered into this suspension over the course of 340 minutes. Throughout the addition, the pH is held constant at 1.8 with 32% NaOH solution.

After the end of the addition, precipitation is completed by stirring at 80° C. for a further 15 minutes. The pH of the suspension is raised to 7.5 with 32% NaOH solution, and 704 g of a sodium waterglass solution (13.5% by weight $SiO_2$) are metered in over the course of 230 minutes. During this addition, the pH is held constant at 7.5 with 10% hydrochloric acid. After the end of the addition, precipitation is completed by stirring at 80° C. for a further 15 minutes.

The pH of the suspension is lowered to 2.0 with 10% hydrochloric acid.

300 ml of a 3% $SnCl_4$ solution are metered in over the course of 100 minutes. Throughout this time, the pH is held constant at 2.0 with 32% NaOH.

After a subsequent stirring period of 15 minutes, the pH is lowered to 1.8 with 10% hydrochloric acid and 922 ml of an aqueous $TiCl_4$ solution (400 g $TiCl_4$/l) are metered in over the course of 300 minutes. Throughout the addition, the pH is held constant at 1.8 with 32% NaOH solution.

After the end of the addition, precipitation is completed by stirring at 80° C. for a further 15 minutes. Subsequently, the mixture is cooled to room temperature and the resulting pigment is filtered off, washed salt-free with deionized water and dried at 110° C. Thereafter, the pigment is calcined at 700° C. for 30 minutes.

This gives a pigment of grey-green powder color with a pronounced color flop.

Example 13

105 g of a blue-green interference pigment consisting of mica which is coated with titanium dioxide and also has an outer layer of a mixed oxide of the formula $Cu_xMn_{3-x}O_4$ are suspended in 2 l of deionized water and the suspension is heated to 75° C. with continual stirring.

The pH of the suspension is adjusted to 7.5 and 153 g of a sodium waterglass solution (13.5% by weight $SiO_2$) are metered in over the course of 75 minutes. During this addition, the pH is held constant at 7.5 with 10% hydrochloric acid. After the end of the addition, recipitation is completed by stirring at 75° C. for a further 45 minutes.

The pH of the suspension is lowered to 2.2 with 10% hydrochloric acid.

330 ml of an aqueous $TiCl_4$ solution (400 g $TiCl_4$/l) are metered in over the course of 165 minutes. Throughout the addition, the pH is held constant at 2.2 with 32% NaOH solution.

After the end of the addition, precipitation is completed by stirring at 75° C. for a further 45 minutes. Subsequently, the mixture is cooled to room temperature and the resulting pigment is filtered off, washed salt-free with deionized water and dried at 110° C. Thereafter, the pigment is calcined at 600° C. for 30 minutes.

The resultant pigment exhibits a green powder color with a deep green interference color.

Example 14

126 g of a blue-green interference pigment consisting of mica which is coated with titanium dioxide and also has an outer layer of a mixed oxide of the formula $Cu_xMn_{3-x}O_4$ are suspended in 2 l of deionized water and the suspension is heated to 80° C. with continual stirring.

The pH of the suspension is adjusted to 7.5, and 533 g of a sodium waterglass solution (13.5% by weight $SiO_2$) are metered in over the course of 270 minutes. During this addition, the pH is held constant at 7.5 with 10% hydrochloric acid. After the end of the addition, precipitation is completed by stirring at 80° C. for a further 15 minutes.

The pH of the suspension is lowered to 2.0 with 10% hydrochloric acid.

100 ml of a 3% $SnCl_4$ solution are metered in over the course of 25 minutes. Throughout this time, the pH is held constant at 2.0 with 32% NaOH solution.

After a subsequent stirring period of 15 minutes, the pH is lowered to 1.8 with 10% hydrochloric acid and 740 ml of an aqueous $TiCl_4$ solution (400 g $TiCl_4$/l) are metered in over the course of 370 minutes. Throughout the addition, the pH is held constant at 1.8 with 32% NaOH solution.

After the end of the addition, precipitation is completed by stirring at 80° C. for a further 15 minutes. Subsequently, the mixture is cooled to room temperature and the resulting pigment is filtered off, washed salt-free with deionized water and dried at 110° C. Thereafter, the pigment is calcined at 600° C. for 30 minutes.

This gives a pigment of green powder color with a pronounced color flop.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A pearl luster pigment comprising a platelet shaped, non-metallic substrate which is opaque and having at least
   (a) one first layer comprising a metal oxide of high refractive index, or a metal
   (b) one second layer comprising a metal oxide of low refractive index, and
   (c) one third layer comprising a metal oxide of high refractive index, or a metal,
      wherein the substrate is of graphite platelets or is a platelet shaped carrier material coated with graphite.

2. A pearl luster pigment according to claim 1, wherein the metal oxide of high refractive index or metal is $TiO_2$, $ZrO_2$, $Fe_2O_3$, $(SnSb)O_2$, $Fe_3O_4$, $Cr_2O_3$, ZnO, a mixture of these oxides, nickel, or aluminum.

3. A pearl luster pigment according to claim 1, wherein the metal oxide of low refractive index is $SiO_2$, $Al_2O_3$, or a mixture thereof.

4. A process for preparing the pearl luster pigment according to claim 1, which comprises coating the substrate suspended in water alternately with a metal oxide hydrate of high refractive index and a metal oxide hydrate of low refractive index, by addition oxide hydrate of high refractive index and a metal oxide hydrate of low refractive index, by addition and hydrolysis of the corresponding, water-soluble metal compounds, the pH required for the precipitation of the respective metal oxide hydrate being established and kept constant by simultaneous addition of acid or base, and subsequently separating the coated substrate from the aqueous suspension, drying and, optionally calcining it.

5. A process according to claim 4, wherein the metal oxide hydrate of high refractive index is an oxide hydrate of titanium, zirconium, iron, chromium, zinc, tin or antimony, or a mixture of these oxide hydrates.

6. A process according to claim 4, wherein the metal oxide hydrate of low refractive index is an oxide hydrate of silicon, aluminum, or a mixture thereof.

7. A process for preparing the pearl luster pigment according to claim 1, wherein at least one metal oxide or metal layer is applied by CVD in a fluidized-bed reactor.

8. A paint, printing ink, plastic, cosmetic, or glaze for ceramics and glass composition which comprises a pigment according to claim 1 for pigmenting.

9. A composition according to claim 8 which contains the pearl luster pigment in mixture with at least one conventional pigment or other effect pigment.

10. A pearl luster pigment according to claim 1, which further comprises one or more subsequent layer(s) over the third layer.

11. The pigment of claim 10, wherein at least one subsequent layer is a layer of colored metal oxide, complex salt pigment, organic dye, aluminum lake, metal chalcogenide or hydrate thereof, or carbon black.

12. A laser-markable polymeric material or paper which comprises a pigment according to claim 1 therein.

13. A security, document paper or packaging material which comprises a pigment according to claim 1 therein.

* * * * *